UNITED STATES PATENT OFFICE.

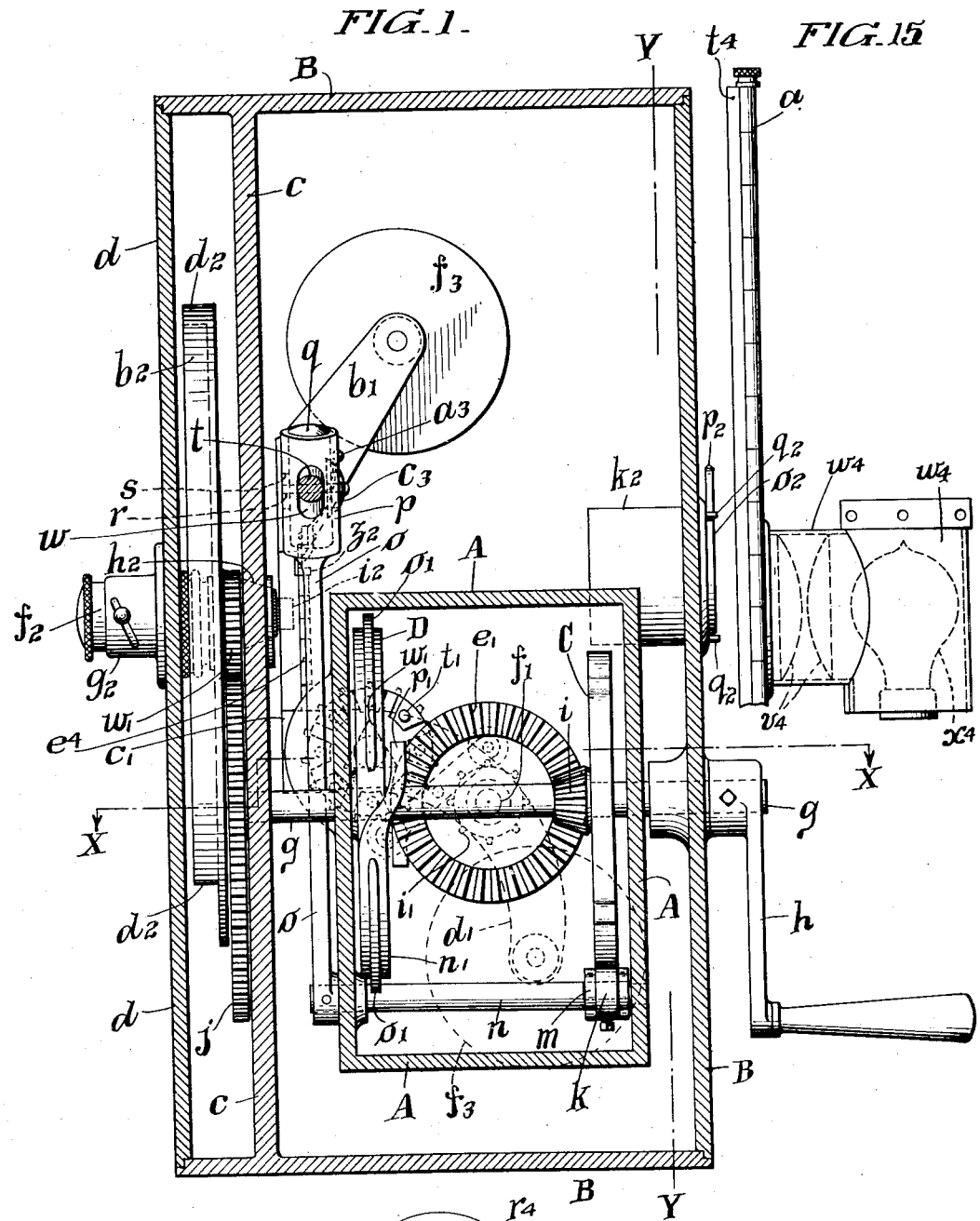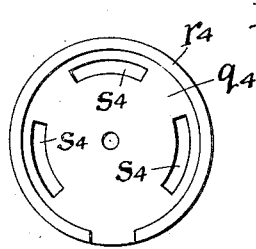

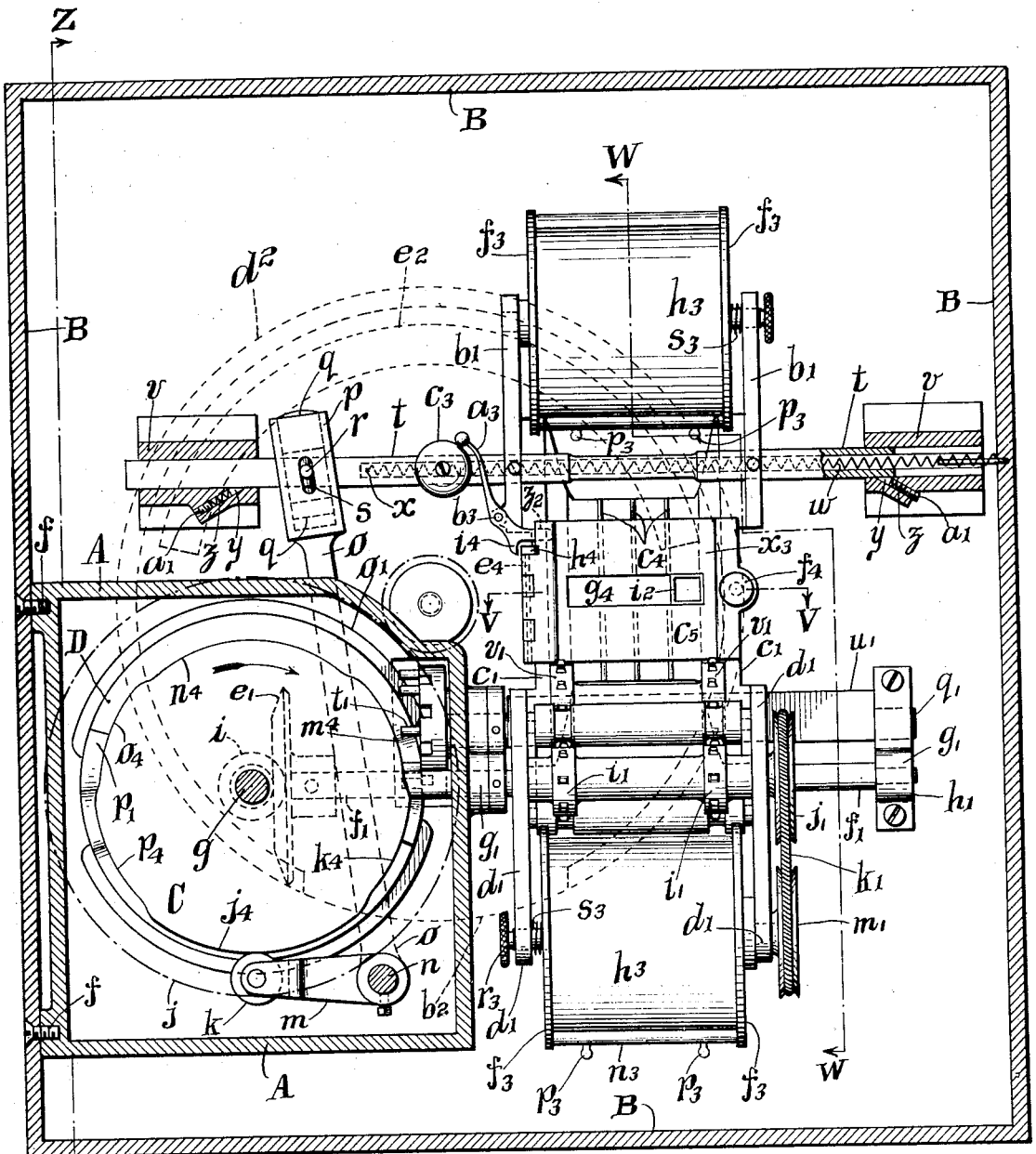

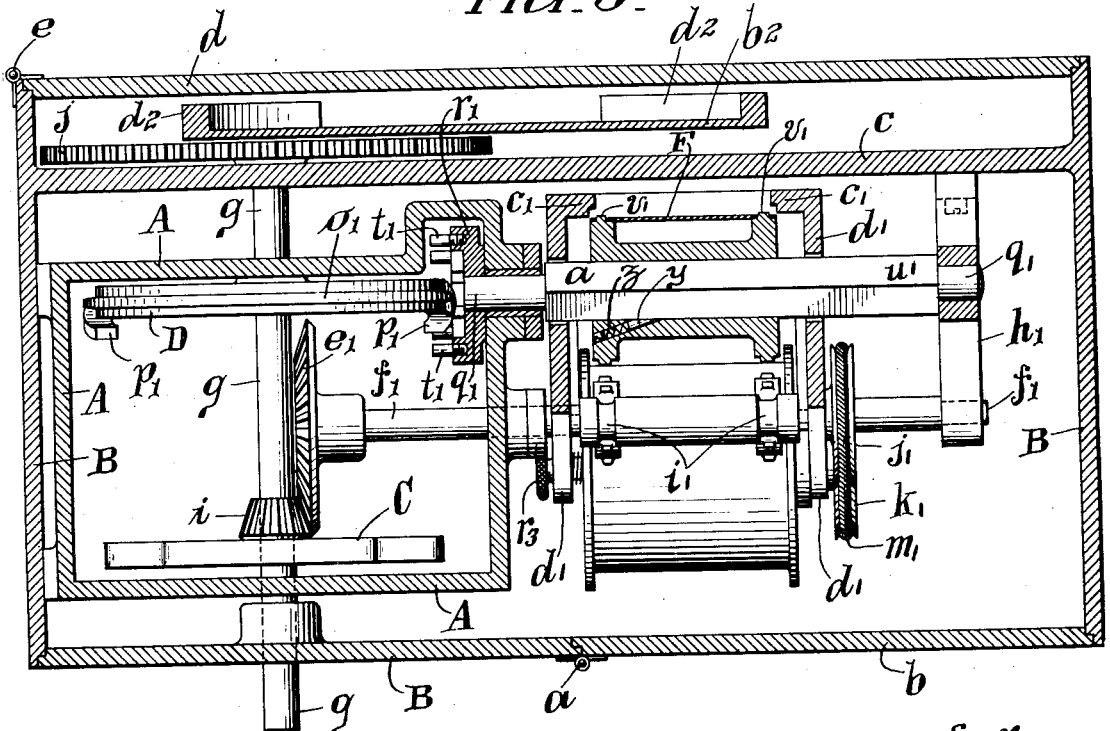
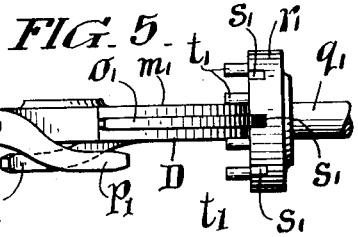
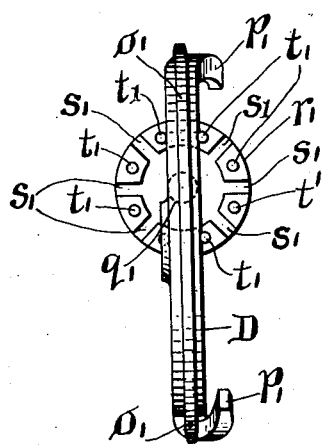
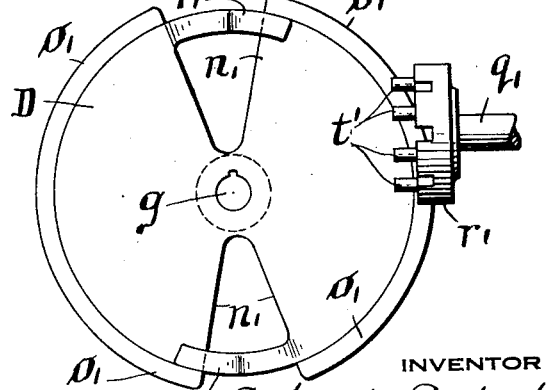

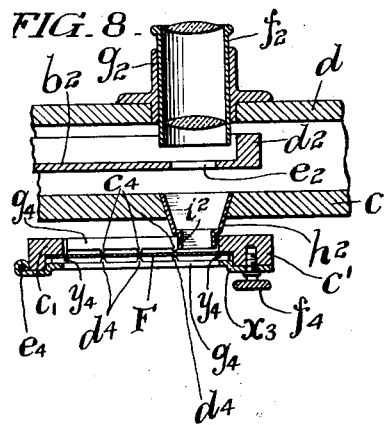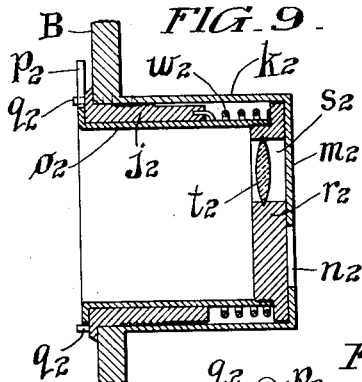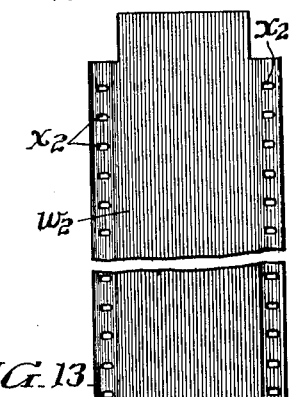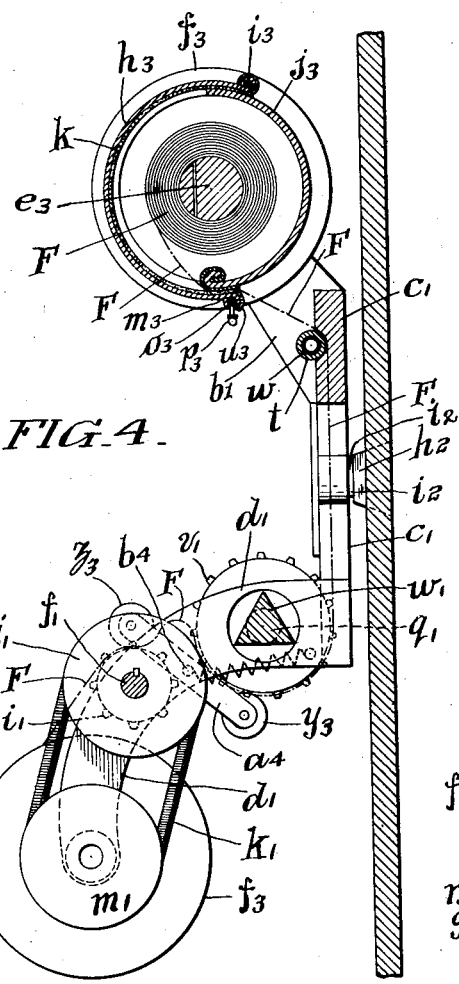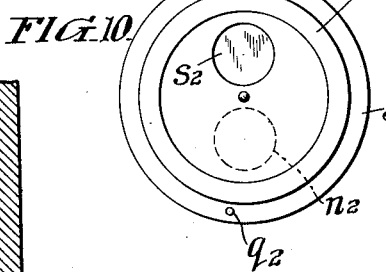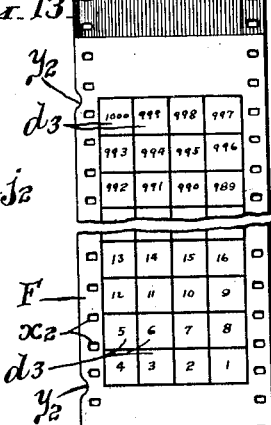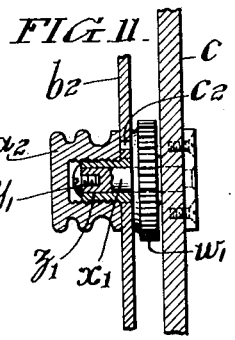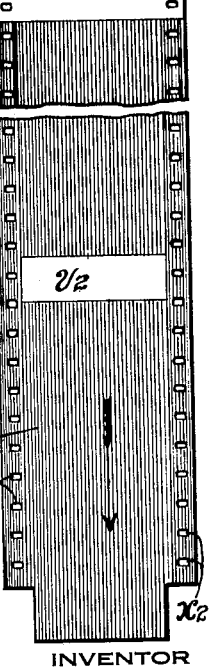

RICHARD H. PIETZSCH, OF PHILADELPHIA, PENNSYLVANIA, ASSIGNOR TO CINO CAMERA COMPANY, OF PHILADELPHIA, PENNSYLVANIA, A CORPORATION OF DELAWARE.

MOTION-PICTURE APPARATUS.

1,224,500.      Specification of Letters Patent.      Patented May 1, 1917.

Application filed August 8, 1914. Serial No. 855,723.

*To all whom it may concern:*

Be it known that I, RICHARD H. PIETZSCH, a citizen of the United States, residing in the city of Philadelphia, county of Philadelphia, and State of Pennsylvania, have invented a new and useful Motion-Picture Apparatus, of which the following is a specification.

My invention relates to motion picture apparatus suitable for projection of motion pictures, as upon a screen, and for a motion picture camera for making photographic exposures in a kinetographic series.

It is the object of my invention to provide apparatus for moving the film or other picture unit support, which is sensitized when the apparatus is used in a camera and through whose picture units light is projected when used in a projection apparatus, the picture units being so disposed in kinetographic series that they extend in neighboring rows across the film, the kinetographic series extending across the film in one row of picture units, then into the next row and back across the film in opposite direction, and so on.

With such arrangement of the picture units, the film and the lens are moved intermittently and transversely with respect to each other, then longitudinally with respect to each other, then transversely, and so on until all of the picture units of the kinetographic series have been brought in succession in operative relation with respect to the lens or optical axis.

Apparatus of this character is suitable for general motion picture work, and is particularly suitable for small or amateur apparatus, in which case the picture units may be very small as compared with the picture units of the standard present day film.

My invention resides in apparatus of the character hereinafter described.

For an illustration of one of the forms my invention may take, reference is to be had to the accompanying drawings, in which:

Figure 1 is a vertical sectional view, some parts in elevation, taken on the line Z—Z of Fig. 2.

Fig. 2 is a vertical sectional view, some parts in elevation, taken on the line Y—Y of Fig. 1.

Fig. 3 is a horizontal sectional view, some parts in plan, taken on the line X—X of Fig. 1.

Fig. 4 is a fragmentary vertical sectional view taken on the line W—W of Fig. 2.

Fig. 5 is a top plan view of means controlling and locking the mechanism for feeding the film longitudinally.

Fig. 6 is a side elevational view of the parts shown in Fig. 5.

Fig. 7 is an end elevational view of the parts shown in Fig. 5.

Fig. 8 is a fragmentary sectional view taken on the line V—V of Fig. 2.

Fig. 9 is a vertical sectional view through an attachment used in connection with a camera for focusing purposes.

Fig. 10 is an end elevational view of the parts shown in Fig. 9.

Fig. 11 is a detail sectional view illustrating means for attaching the shutter to its driving means.

Fig. 12 is a sectional view through a film reel and its box.

Fig. 13 is an illustration of a form of film which may be used in the apparatus.

Fig. 14 is an elevational view, on small scale, of a type of shutter which may be used in the projecting apparatus.

Fig. 15 is a fragmentary elevational view of a detachable door carrying a light source for picture projection.

The apparatus is mounted in a box B having the rear door $b$ hinged at $a$ and the inner front wall $c$ spaced from the outer front wall $d$ which may be hinged to the box B at $e$.

Secured to a wall of the box B within the box, as by screws $f, f$, is the metallic frame A through which extends the main shaft $g$ which extends to the outside of the box B where there is secured to the shaft $g$ the operator's crank $h$.

Secured upon the shaft $g$ is a cam C, a bevel pinion $i$, a second cam member D, and in the space between the front $c$ and $d$ a gear $j$.

Upon the periphery of the cam C bears a roller $k$ pivoted at the outer end of the lever $m$ which is secured upon the shaft $n$ having pivotal movement in the frame A. At its other end there is secured to the pivotal shaft $n$ the lever $o$ having the hollow cylindrical head $p$ in which may move longitudinally the plug $q$. The plug $q$ is pivoted by pin $r$ upon the rod $t$, the pin $r$ extending through the longitudinally extending slots $s$ in the member $p$, and the rod $t$ extends through the longitudinal slots $u$ in the members $p$ and $q$. The rod $t$ is supported and movable longitudinally in the blocks $v$ supported upon the box B. The rod $t$ has a cylindrical bore in which is disposed the spring $w$ secured at its one end at $x$ to the rod $t$ and at its outer end to any suitable stationary part, such as a wall in the box B. The spring $w$ is under tension and tends to pull the rod $t$ toward the right as viewed in Fig. 2. In holes in the blocks $v$ are disposed members $y$ having beveled ends resting against the rod $t$ and pressed forward by springs $z$ held in place by screws plugs $a^1$. This construction also applies to sprocket $v^1$. By this construction the rod $t$ is held accurately and firmly in place, yet is easily slidable longitudinally in the members $v$. The self-adjusting members $y$ serve to take up any lost motion or wear.

Secured to the rod $t$ are the vertically extending brackets $b^1$, $b^1$ secured upon the frame $c^1$ to which in turn are secured the downwardly curving brackets $d^1$.

The bevel pinion $i$ meshes with the bevel gear $e^1$ secured upon the shaft $f^1$ having bearings $g^1$, $g^1$ carried by the frame A and the bracket $h^1$. The shaft $f^1$ extends through the brackets $d^1$, and upon the shaft $f^1$ between these brackets $d^1$ is disposed the continuously rotating film take-up sprocket $i^1$ which is rotated by the shaft $f^1$ and capable of movement longitudinally of the shaft $f^1$. Rotatable with the take-up sprocket $i^1$ and movable with it longitudinally of the shaft $f^1$ is the pulley $j^1$ which drives the belt $k^1$ which in turn drives the pulley $m^1$, the belt $k^1$ fitting loosely so that it may slip upon the pulley $m^1$ which latter rotates the film re-wind spool or reel.

The cam D rotated by the shaft $g$ comprises, as best seen in Figs. 5, 6 and 7, the disk or wheel $n^1$ having the circumferentially discontinuous peripheral ribs $o^1$, $o^1$ which lie in the same plane throughout their extents. Between the ends of the ribs $o^1$, $o^1$ extend the cam projections $p^1$, $p^1$ on the disk $n^1$ which are deflected laterally, as shown in Figs. 5 and 7, from the principal plane of the cam member D. At right angles to the shaft $g$ is the shaft $q^1$ to which is secured the crown $r^1$ having the equally spaced slots $s^1$ between which are disposed the pins $t^1$.

As the cam D is rotated by shaft $g$ a cam projection $p^1$ will engage between two neighboring pins $t^1$, out of the plane of the axis of the shaft $q^1$, and in continuing rotation will, due to engagement of the sides of members $p^1$ against these pins, rotate the crown $r^1$ and the shaft $q^1$ the angular distance between two neighboring slots $s^1$, $s^1$, this cam action and rotation taking place until the wheel or disk member $n^1$ brings the two pins into the position shown in Fig. 5 symmetrical with respect to the axis of the shaft 21. In this position the member $n^1$ fits between the two pins and a slot $s^1$ is directly in the plane of the axis of the shaft $q^1$ and the rib $o^1$ enters such slot and therefore locks the shaft $q^1$ from further rotation until the rib $o^1$ has passed completely through the slot, whereupon the next cam projection member $p^1$ engages the next pair of pins and, since the shaft 21 is now unlocked because of absence of the rib $o^1$ from a slot $s^1$ and disk $n^1$ from between two pins, rotates the shaft $q^1$ through the same distance previously described, whereupon the second rib $o^1$ engages in the next slot $s^1$ to again lock the shaft for a period of time. By this mechanism the shaft $g$ drives the shaft $q^1$ intermittently and at the same time locks the shaft $q^1$ between its intermittent movements. The shaft $q^1$ has a bearing in the frame A and also in the bracket $h^1$. Between its bearings the shaft $q^1$ has an angular form, in this instance indicated as of triangular section $u^1$, this triangular section extending through clearance holes in the brackets $d^1$. Movable longitudinally upon this member $u^1$ and disposed between the brackets $d^1$, $d^1$ is the intermittent film feeding sprocket $v^1$ having a triangular longitudinal opening through which the member $u^1$ extends and by which said sprocket $v^1$ is intermittently rotated.

The gear $j$ driven by shaft $g$ meshes with a pinion $w^1$ on whose shaft $x^1$, as seen in Fig. 11, is secured by screw $y^1$ a collar $z^1$ upon which is threaded the nut $a^2$ between which and the hub of the gear $w^1$ is held the shutter wheel $b^2$ positively driven by the pin $c^2$ carried by the gear $w^1$ and entering a perforation in the member $b^2$. Throughout more or less of its circumference the wheel $b^2$ has the flange $d^2$. And in the member $b^2$ is the arc shaped slot $e^2$ adapted to pass the objective or lens $f^2$ adjustable longitudinally in the barrel $g^2$ for focusing purposes, as well understood in the art. And in alinement with the lens and disposed in the inner front wall $c$ is the member $h^2$ having the part $i^2$ having an opening determining the size of a picture unit on the movable film F when the apparatus is used as a camera.

As shown in Figs. 9 and 10, there extends through the rear wall of the box B, substantially opposite the lens $f^2$, a sleeve $j^2$ on which is threaded the cylindrical member $k^2$ having the end $m^2$ provided with an aperture $n^2$. Rotatable within the sleeve $j^2$ is the cylindrical member $o^2$ having the handle $p^2$, the member $j^2$ having pins $q^2$ for limiting the rotary movement of the member $o^2$. Threaded into the member $o^2$ is the member $r^2$ having the aperture $s^2$ in which may be provided, if desired, a magnifying or focusing lens $t^2$. Surrounding the member $o^2$ is the helical spring $u^2$ whose one end is attached to the member $j^2$ and whose other end is attached to the member $r^2$, this spring serving as a torsion spring to normally hold the parts in the position shown in Figs. 9 and 10. The aperture $n^2$ being in the optical axis of the lens $f^2$, upon rotation of the member $o^2$ by handle $p^2$ the aperture $s^2$ comes into register with the aperture $n^2$, whereby the operator may look through these apertures toward the lens $f^2$, the lens $f^2$ being simultaneously adjusted longitudinally in the sleeve $g^2$ to secure sharp focus as determined by the image thrown by the lens $f^2$ upon the translucent member $v^2$ of the film F, Fig. 13.

A form of film suitable for use in this apparatus, though it will be understood that my invention is not limited to this form of film and that other suitable films may be used, is shown in Fig. 13 and is similar to the film disclosed in my prior application Ser. No. 801,797, filed November 19, 1913. It comprises the film F proper with opaque tabs or extensions $w^2$, $w^2$ of length sufficient to completely surround the film F proper when wound up upon a spool or reel to render the same light proof, if sensitized for use in the motion picture camera. Both the film proper and these tabs or extensions are here shown as provided with the marginal perforations $x^2$ for engagement by the teeth of the hereinbefore mentioned sprockets. Approximate the joints between the film F proper and the tabs 32 are depressions $y^2$, $y^2$. In feeding the film vertically downward as indicated by the arrow in Fig. 13, the lower depression $y^2$ first comes opposite the tail $z^2$, Figs. 1 and 2, allowing the hammer lever $a^3$, pivoted at $b^3$ on a bracket $b^1$ to strike the bell $c^3$ to give an audible signal to the effect that the beginning of the film F proper has come to a position near the optical axis. And a similar signal is given by the upper notch $y^2$ when the last of the film F proper has passed.

The picture units are arranged, in the example illustrated, in successive rows, four picture units per row, the kinetographic series being indicated by the numerals on these picture units $d^3$.

In the lower tab $w^2$ is the insert or member $v^2$, of celluloid or other suitable transparent material, which has been roughened, like a ground glass, so that when in the field of the lens $f^2$ objects will be projected on the same as visible through the apertures $s^2$ and $n^2$, and the lens $f^2$ may be adjusted until the picture projected upon the member $v^2$ is in sharp focus.

The sensitized film, or the positive film procured by exposure, development and printing, is wound upon a suitable spool or reel.

In Fig. 12 such a spool or reel is shown as comprising the wooden or other spool member $e^3$ which is rotatable upon the cylindrical projections or hubs $g^3$ on the flanges $f^3$. These flanges $f^3$ form the ends of a cylindrical light proof box comprising a cylindrical cover member $h^3$ pivoted at $i^3$ upon the complementary cylindrical shell member $j^3$ fixed to the flanges $f^3$, see Fig. 4. The member $h^3$ has a lining $k^3$ of velvet, and a member $m^3$ preferably also of velvet, is secured at the lower edge of the member $j^3$ as shown in Fig. 4, the film passing out of the box between the members $k^3$ and $m^3$ which press against the film. At its lower edge the member $h^3$ terminates in a bead $n^3$ in which are longitudinally movable the latching pins $o^3$ adapted to engage the flanges $f^3$ to hold the cover $h^3$ in place. The latches $o^3$ may be withdrawn toward each other by pressure upon the handles $p^3$, a spring $q^3$ disposed in the bead $n^3$ opposing such movement of the members $o^3$. The reel or spool box such as described is held by the brackets $b^1$, $b^1$, between laterally movable pins or pivots engaging at the centers of the flanges $f^3$. The description thus far is common both to the reel box in which the film is stored before passage through the machine and the reel box into which the film is re-wound as it passes through the machine. Fig. 12, however, refers more specifically to the rewind box which is shown supported at one end upon the member $r^3$ whose outward movement is opposed by a spring $s^3$ as shown in Fig 2, such member $r^3$ being utilizable also for the upper reel box. To drive the spool $e^3$ to re-wind the film there is provided the disk $t^3$ pivoted in one of the lower brackets $d^1$ and driven by the pulley $m^1$. The disk $t^3$ has an aperture receiving the crank pin $u^3$ on the member $v^3$ which has a central boss fitting into the part $g^3$ of one of the flanges $f^3$, the member $v^3$ carrying a member $w^3$ which engages and drives the spool $e^3$.

The film is threaded through the machine by pulling the tab $w^2$ out between members $m^3$ and $k^3$ and passing it over the rod $t$, at its part of reduced diameter as shown in Fig. 2, thence downwardly between the frame $c^1$ and the clamping door or frame $x^3$, Figs. 2 and 8, thence over the intermittent take-up or feed sprocket $v^1$, over the idler roller $y^3$, Fig. 4, thence under the idler roller $z^3$ and over the continuously rotating take-up sprocket $i^1$ into the lower reel box in which it is wound up by the pulley $m^1$. Between the sprocket $v^1$ and the sprocket $i^1$ the film is looped to provide a slack portion, as indicated in Fig. 4, in the well known manner. The idlers $y^3$ and $z^3$ are pivoted upon the lever $a^4$ pivoted at $b^4$ in the brackets $d^1$.

After leaving the rod $t$ the film passes between the members $c^1$ and $x^3$ as stated, both of these members having vertical ribs $c^4$ and $d^4$ respectively, as shown in Figs. 2 and 8, and these ribs come opposite the spaces between the picture units $d^3$. The door or pressure plate member $x^3$ is hinged to the frame $c^1$ at $e^4$, and is held in place by the thumb screw $f^4$ threaded into the frame $c^1$, bowed springs $y^4$, $y^4$ being disposed between member $x^3$ and the film in the well known manner.

The frame or member $x^3$ and frame $c^1$ have registering transverse slots $g^4$, Fig. 2, whose transverse length is slightly more than the length of a row of picture units $d^3$, and whose height is equal to the height of the member $i^2$ whose aperture is substantially the size and shape of a picture unit, the member $i^2$ registering with the aperture $g^4$ in member $x^3$ and extending into slot $g^4$ in the member $c^1$. The door $x^3$ has a lug $h^4$ coöperating with a lug $i^4$ on the lever $a^3$ to hold that lever raised from the bell $c^3$ when door $x^3$ is open to remove lug $z^2$ out of path of film while threading the film through the machine.

The operation is as follows:

Assuming the apparatus to be operating as a camera for making photographic exposures of objects in motion, a sensitized film is stored in the upper reel box and its lower tab $w^2$ threaded through a machine as previously described and connected to the lower take-up or re-wind reel. The tab $w^2$ is drawn downwardly until the member $v^2$ comes into register with the aperture $g^4$ and the aperture member $i^2$, whereupon the handle $p^2$ is turned to bring the aperture $s^2$ into alinement with the aperture $n^2$, when the operator may look through at member $v^2$ and see projected thereon the picture to be taken. He may then adjust the lens $f^2$, if necessary, to secure sharp focus on the member $v^2$ whose ground or roughened surface is in the plane of the sensitized emulsion. The lens $t^2$ may serve to magnify the image projected by lens $f^2$ upon member $v^2$ to more easily determine the sharpest focus. The handle $p^2$ is then released and the spring $w^2$ restores the parts to the position shown in Fig. 9, thus preventing light from entering aperture $n^2$ into the interior of the camera.

The crank $h$ is then rotated at suitable speed, thus simultaneously rotating the cam C, the bevel pinion $i$, the cam D and the gear $j$.

As the cam C rotates from the position indicated in Fig. 2, where the roller $k$ is at a maximum distance from the center of the shaft $g$, the roller $k$ will make three successive movements toward the shaft $g$, under the influence of the spring $w$, these movements of the roller $k$ allowing the head $p$ of lever $o$ to make three successive movements toward the right, thus carrying the rod $t$ toward the right in three successive movements, the rod $t$ carrying the feed and take-up sprockets and the film, which all move together. The first movement to the right occurs when the roller $k$ moves from the portion $j^4$ of cam C which is a part of a circle with the center of shaft $g$ as its center, to the circular part $k^4$ of less diameter. This movement moves the frame $c^1$ and all the parts carried by it toward the right the width of one picture unit, so that the lens $f^2$ and the member $i^2$ come opposite the second vertical row. The frame remains at rest at such position for a time corresponding with the circumferential length of the part $k^4$ of the cam. Then the roller $k^4$ drops to the portion $m^4$ of still less diameter, which brings the movable frame and parts opposite the next vertical row of picture units; and then the roller drops to the circular portion $n^4$ in which position the lens $f^2$ is opposite the fourth or left hand row. The circumferential extent of the parts $n^4$ and $j^4$ are equal and cause the parts to remain at the end positions a little more than twice the time of rest at the intermediate rows. When the roller has traversed about one-half of the part $n^4$ the cam D, through the mechanism hereinbefore described, unlocks and rotates the sprocket $v^1$ through such angle as to pull the film F vertically downward a distance equal to the height of a picture unit, and then re-locks sprocket $v^1$. Then upon completing traverse of the part $n^4$ the roller rises on to the part $o^4$ reversing the movement of the frame $c^1$ and the attached parts and bringing the lens $f^2$ opposite the second row from the left. Then the roller $k$ rises on to the next part $p^4$ causing a further movement toward the left of the frame $c^1$, and then it rises again to the part $j^4$ carrying the frame $c^1$ to the position indicated in Fig. 2. Here it remains for a period of time equal to the period of time occupied for the roller $k$ to traverse the part $n^4$. And in about the middle of such period the cam D again unlocks and rotates the sprocket $v^1$ to pull down the film a distance equal to the height of a picture unit. And so on, the film $c^1$ traverses the optical axis and while so traversing the film feed sprocket is locked and while frame $c^1$ is at each end of its travel the film is fed downwardly. In this manner the lens projects upon the film successive picture units in a kinetographic series, which series extends backwardly and forwardly across the film and at each traverse the film steps up into the next row.

While the frame $c^1$ is at rest the shutter aperture $e^2$ is opposite the lens $f^2$ thus allowing a photograph to be taken. The light is shut off by the shutter $b^2$ just before the frame $c^1$ again moves or just before the sprocket $v^1$ is actuated.

And throughout the movement of the crank $h$ the sprocket $i^1$ rotates continuously to take up the film beyond the loop or slack and the film is wound up in the lower reel box by the pulley $m^1$.

It will be noted that the cam C rotates always in the same direction, and because of the successive steps to diminishing diameters followed by successive steps to increasing diameters the rod $t$ is first stepped in one direction and then in reverse direction.

When the apparatus is to be used for projecting motion pictures as upon a screen, a shutter, such as $q^4$, Fig. 14, is substituted for the shutter $b^2$. In Fig. 14 the shutter $q^4$ is shown on small scale and comprises the flange $r^4$ and the arc shaped apertures $s^4$.

And the rear door $b$, Fig. 3, is removed and in its place, on the hinge $a$, is substituted the door member $t^4$, Fig. 15, which has an aperture with which registers the shell $u^4$ within which may be disposed condenser lenses $v^4$, $v^4$ behind which in the chamber $w^4$ is any suitable source of light such as an electric lamp $x^4$.

The light from the lamp $x^4$ passes through the condenser lenses and through the film and then through the projecting lens which may be the lens $f^2$ or any other suitable lens substituted therefor. Then upon turning the crank $h$ the positive film is fed in the manner described above in connection with the sensitized film, with the result that motion pictures are projected.

What I claim is:

1. In motion picture apparatus, the combination with a laterally movable frame, of film supporting means carried thereby, means biasing said frame toward one position, and means for intermittently moving said frame away from said position and permitting intermittent return to said position.

2. In motion picture apparatus, the combination with a laterally movable frame, of film supporting means carried thereby, means biasing said frame toward one position, and a cam for intermittently moving said frame away from said position and allowing intermittent return to said position.

3. In motion picture apparatus, the combination with a laterally movable frame, of film supporting means carried thereby, a continuously rotating shaft, and a single continuously rotating cam mechanism intervening between said shaft and said frame, said mechanism driven by said shaft and controlling intermittent forward and backward movement of said frame.

4. In motion picture apparatus, the combination with a laterally movable frame, of film supporting means carried thereby, a continuously rotating cam mechanism, and a member connected with said frame and engaging said cam mechanism, said member intermittently moved as said cam mechanism rotates for controlling intermittent forward and backward movement of said frame.

5. In motion picture apparatus, the combination with a laterally movable frame, of film supporting means carried thereby, a lever connected to said frame for moving the same, and a cam controlling intermittent movement of said lever.

6. In motion picture apparatus, the combination with a laterally movable frame, of film supporting means carried thereby, a lever connected to said frame for moving the same, and a continuously rotating cam intermittently actuating said lever backwardly and forwardly.

7. In motion picture apparatus, the combination with a laterally movable frame, of film supporting means carried thereby, means for feeding said film in a direction at right angles to said lateral movement movable with said frame, means for imparting to said frame intermittent lateral movement, means with respect to which said frame is movable for locking said film feeding means during lateral movement of said frame, means for actuating said film feeding means at the limits of lateral movements of said frame, and a continuously rotating film take-up sprocket.

8. In motion picture apparatus, the combination with a laterally movable frame, of means for feeding said film in a direction at right angles to said lateral movement carried by said frame, means for intermittently moving said frame, and means for intermittently actuating and locking said film feeding means comprising a member with respect to which said film feeding means are laterally movable and fixed as regards rotation, a plurality of projections on said member, a cam for engaging a projection to rotate said member, and means movable with said cam for locking said member.

9. In motion picture apparatus, the combination with a transversely movable frame, of film supporting means carried thereby, means carried by said frame for intermittently feeding said film longitudinally, a continuously rotating film engaging sprocket movable with said frame, means for intermittently moving said frame, means for intermittently locking and actuating said film feeding means, and means for continuously rotating said sprocket, said film feeding means and said sprocket being movable longitudinally of their actuating means.

10. The combination with a film of means for actuating the same, means for actuating said means comprising a rotary head, a plurality of projections thereon, a rotary member having laterally disposed cam surface for actuating said projections to rotate said head, and means complementary to said cam surface for engaging between said projections to lock said head when said cam surface is inactive.

11. The combination with a film feeding sprocket, of a rotary head, said head having a plurality of slots, a plurality of pins carried by said head, a rotary member having a cam surface adapted to engage said pins to rotate said head, and a complementary rib on said rotary member adapted to engage in said slots to lock said head.

12. The combination with a film having picture units thereon in kinetographic series, said series comprising rows of picture units extending transversely to said film, of members between which said film passes, and ribs on said members disposed at the intervals between neighboring picture units of a row.

13. The combination with a stationary light transmitting tube, of a laterally movable frame having a slot into which said tube projects, and a film carried by said frame and disposed in front of said tube.

14. In motion picture apparatus, the combination with a laterally movable frame, of a picture film having marginal perforations, said film carried by said frame, a sprocket carried by said frame for engaging said perforations for feeding said film longitudinally, means for intermittently moving said frame, means for intermittently moving said sprocket, and a continuously rotating film take-up sprocket movable laterally with said frame.

15. In motion picture apparatus, the combination with a laterally movable frame, of film supporting means carried by said frame, means carried by said frame for feeding said film longitudinally, a continuously rotating shaft, a cam secured to said shaft controlling intermittent movement of said frame with respect to said shaft in both directions, and means secured to said shaft intermittently actuating and locking said film feeding means.

16. In motion picture apparatus, the combination with a laterally movable frame, of film supporting means carried by said frame, means carried by said frame for feeding said film longitudinally, a continuously rotating shaft, a cam secured to said shaft controlling intermittent movement of said frame with respect to said shaft in both directions, means secured to said shaft intermittently actuating and locking said film feeding means, a continuously rotating sprocket carried by said frame and engaging said film, and means secured to said shaft for continuously rotating said sprocket.

17. In motion picture apparatus, the combination with a laterally movable frame, of film supporting means carried thereby, continuously rotating cam mechanism, and a member connected with said frame controlling intermittent lateral movement thereof in both directions and continuously bearing upon said cam mechanism.

18. In motion picture apparatus, the combination with a laterally movable frame, of film supporting means carried thereby, continuously rotating mechanism having cam surfaces, and a member connected to said frame controlling intermittent lateral movement thereof in both directions and continuously bearing upon said cam surfaces.

19. In motion picture apparatus, the combination with a laterally movable frame, of film supporting means carried thereby, continuously rotating cam mechanism, and an oscillating member connected with said frame and intermittently actuated by said cam mechanism.

20. In motion picture apparatus, the combination with a laterally movable frame, of film supporting means carried thereby, a pivoted lever connected to said frame, and a continuously rotating cam controlling intermittent movements of said lever.

21. In motion picture apparatus, the combination with a laterally movable frame, of film supporting means carried thereby, means biasing said frame in one direction, a continuously rotating cam mechanism, and means connected with said frame and engaging said cam mechanism allowing intermittent movement of said frame in said one direction and forcing intermittent movement of said frame in opposite direction.

22. In motion picture apparatus, the combination with a laterally movable frame, of film supporting means carried thereby, a pivoted bell crank lever one arm of which is connected with said frame, and cam mechanism engaging another arm of said lever.

23. In motion picture apparatus, the combination with a laterally movable frame, of film supporting means carried thereby, a pivoted bell crank lever one arm of which is connected with said frame, and continuously rotating cam mechanism engaging another arm of said lever.

24. The combination with a film having picture units thereon in kinetographic series, said series comprising rows of picture units extending transversely of said film, a laterally movable frame, members movable with said frame and between which said film passes, one of said members being removable from the other, and ribs on said members disposed at the intervals between neighboring picture units of a row.

25. The combination with a film having picture units thereon in kinetographic series, said series comprising rows of picture units extending transversely of said film, of members between which said film passes, and registering ribs on adjacent sides of said members disposed at the intervals between neighboring picture units of a row.

26. The combination with a film having picture units thereon in kinetographic series, said series comprising rows of picture units extending transversely of said film, of members between which said film passes, ribs on said members disposed at the intervals between neighboring picture units of a row, a lens in front of said members, and a light transmitting tube, one of said members adjacent said lens having a slot into which said tube projects.

27. The combination with a film having picture units thereon in kinetographic series, said series comprising rows of picture units extending transversely of said film, of members between which said film passes, ribs on said members disposed at the intervals between neighboring picture units of a row, a lens in front of said members, a light transmitting tube, one of said members adjacent said lens having a slot into which said tube projects, and means for causing intermittent relative movement between said tube and said members, said tube being disposed between neighboring ribs between movements.

28. The combination with a film feeding sprocket, of a rotary member for rotating said sprocket, a rotary cam member periodically engaging and rotating said rotary member, and means movable with said cam member for engaging and locking said rotary member between movements by said cam member.

29. The combination with a film feeding sprocket, of a rotary member for rotating said sprocket, a continuously rotating cam member periodically engaging and rotating said rotary member, and means movable with said cam member for engaging and locking said rotary member between movements by said cam member.

30. The combination with a film feeding sprocket, of a rotary head, said head having a plurality of slots, a plurality of pins carried by said head, a continuously rotating member having a cam surface adapted to engage said pins to intermittently rotate said head, and a complementary rib on said continuously rotating member adapted to engage in said slots to lock said head.

31. The combination with a film feeding sprocket, of a rotary head, said head having a plurality of slots, a plurality of pins carried by said head, a continuously rotating member comprising a disk and a cam surface, said cam surface adapted to periodically engage said pins to intermittently rotate said head, a complementary rib on said continuously rotating member adapted to engage in said slots to lock said head, said disk adapted to engage between neighboring pins to additionally lock said head.

32. In motion picture apparatus, the combination with a laterally movable frame, of film feeding means movable therewith, film take-up means movable with said frame, longitudinally immovable shafts engaging said film feeding and film take-up means for rotative movement in all positions of said means, means for intermittently rotating the shaft engaging said film feeding means, and means continuously rotating said shaft engaging said film take-up means.

33. In motion picture appartus, the combination with a laterally movable frame, of film feeding means movable therewith, film take-up means movable with said frame, longitudinally immovable shafts engaging said film feeding and film take-up means for rotative movement in all positions of said means, continuously rotating means intermittently rotating and locking said shaft engaging said film feeding means, and continuously rotating means driving said shaft engaging said film take-up means.

34. In motion picture apparatus, the combination with a laterally movable frame, of film feeding means movable therewith, film take-up means movable with said frame, longitudinally immovable shafts engaging said film feeding and film take-up means for rotative movement in all positions of said means, means for intermittently rotating the shaft engaging said film feeding means, means continuously rotating said shaft engaging said film take-up means, and continuously rotating cam mechanism controlling intermittent lateral movements of said frame.

35. In motion picture apparatus, the combination with a laterally movable frame, of film feeding means movable therewith, film take-up means movable with said frame, longitudinally immovable shafts engaging said film feeding and film take-up means for rotative movement in all positions of said means, continuously rotating means intermittently rotating and locking said shaft engaging said film feeding means, continuously rotating means driving said shaft engaging said film take-up means, and continuously rotating cam mechanism controlling intermittent lateral movements of said frame.

36. In motion picture apparatus, the combination with a laterally movable frame, of film feeding means movable therewith, film take-up means movable with said frame, longitudinally immovable shafts engaging said film feeding and film take-up means for rotative movement in all positions of said means, means for intermittently rotating the shaft engaging said film feeding means, means continuously rotating said shaft engaging said film take-up means, and a film re-winding reel driven with said last named shaft.

37. In motion picture apparatus, the combination with a laterally movable frame, of film feeding means movable therewith, film take-up means movable with said frame, longitudinally immovable shafts engaging said film feeding and film take-up means for rotative movement in all positions of said means, means for intermittently rotating the shaft engaging said film feeding means, means continuously rotating said shaft engaging said film take-up means, and a film re-winding reel movable with said frame and driven with said last named shaft.

38. In motion picture apparatus, the combination with a driving shaft, of cam mechanism continuously driven by said shaft, a laterally movable film guiding frame, said cam mechanism controlling intermittent lateral movement of said frame, a second cam mechanism continuously rotated by said shaft, and film feeding means movable with said frame and intermittently rotated by said second cam mechanism.

39. In motion picture apparatus, the combination with a driving shaft, of cam mechanism continuously driven by said shaft, a laterally movable film guiding frame, said cam mechanism controlling intermittent lateral movement of said frame, a second cam mechanism continuously rotated by said shaft, film feeding means movable with said frame and intermittently rotated by said second cam mechanism, and means movable with said second cam mechanism for locking said film feeding mechanism.

40. In motion picture apparatus, the combination with a driving shaft, of cam mechanism continuously driven by said shaft, a laterally movable film guiding frame, said cam mechanism controlling intermittent lateral movement of said frame, a second cam mechanism continuously rotated by said shaft, film feeding means movable with said frame and intermittently rotated by said second cam mechanism, and film take-up means continuously rotated by said shaft.

41. In motion picture apparatus, the combination with a driving shaft, of cam mechanism continuously driven by said shaft, a laterally movable film guiding frame, said cam mechanism controlling intermittent lateral movement of said frame, a second cam mechanism continuously rotated by said shaft, film feeding means movable with said frame and intermittently rotated by said second cam mechanism, means movable with said second cam mechanism for locking said film feeding mechanism, and film take-up means continuously rotated by said shaft.

42. The combination with a film feeding sprocket, of a rotary head, said head having a plurality of projections, a continuously rotating disk, a cam on said disk extending to one side thereof and adapted to engage a projection to rotate said head, said disk after rotation of said head by said cam engaging between neighboring projections to lock said head.

43. The combination with a film feeding sprocket, of a rotary head, a plurality of projections thereon, a continuously rotating disk, a cam on said disk extending to one side thereof and adapted to engage a projection to rotate said head, said head having slots, and a rib on said disk engaging in a slot after said cam has rotated said head.

44. The combination with a film feeding sprocket, of a rotary head, a plurality of projections thereon, a continuously rotating disk, a cam on said disk extending to one side thereof and adapted to engage a projection to rotate said head, said head having slots, and a rib on said disk engaging in a slot after said cam has rotated said head, said disk engaging between neighboring projections after said cam has rotated said head.

In testimony whereof I have hereunto affixef my signature in the presence of the two subscribing witnesses.

RICHARD H. PIETZSCH.

Witnesses:
  NELLIE FIELD,
  ALICE S. MARSH.